A. H. WOLFE.
HOSE COUPLING.
APPLICATION FILED NOV. 17, 1917.

1,258,073.

Patented Mar. 5, 1918.

Inventor
Arthur H. Wolfe
By L. B. James
Attorney

UNITED STATES PATENT OFFICE.

ARTHUR HENRY WOLFE, OF MASSENA, NEW YORK.

HOSE-COUPLING.

1,258,073.  Specification of Letters Patent.  Patented Mar. 5, 1918.

Application filed November 17, 1917. Serial No. 202,441.

*To all whom it may concern:*

Be it known that I, ARTHUR H. WOLFE, a citizen of the United States, residing at 100 Woodlawn avenue, town of Massena, in the county of St. Lawrence and State of New York, have invented certain new and useful Improvements in Hose-Couplings, of which the following is a specification.

This invention relates to hose couplings and more particularly to couplings for attaching a garden or lawn hose to a faucet.

The object of the invention is to provide a simply constructed cheap and efficient device of this character which may be quickly and easily applied to and removed from a faucet and to which a hose may be easily connected.

With the foregoing and other objects in view, which will appear as the description proceeds, the invention resides in the combination and arrangement of parts and in the details of the construction hereinafter described and claimed, it being understood that changes in the precise embodiment of the invention herein disclosed may be made within the scope of what is claimed without departing from the spirit of the invention.

Figure 1:
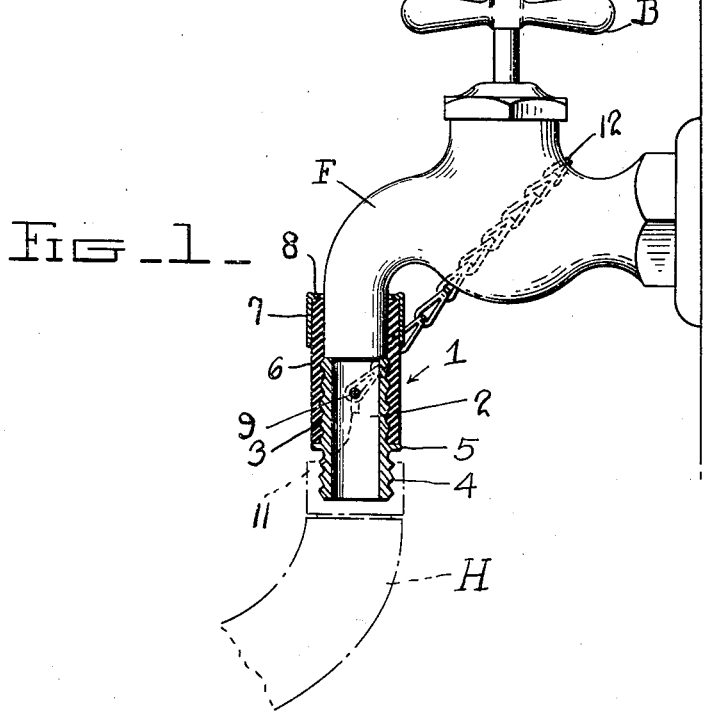
Figure 1 represents a side elevation of a faucet with this improved coupling shown applied and in section, the hose being shown in dotted lines.
Figure 2:
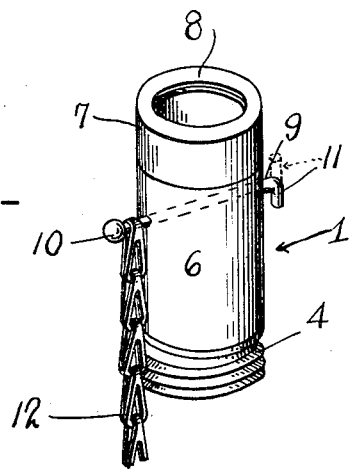
Fig. 2 represents a detail perspective view of a coupling.

In the embodiment illustrated the coupling 1 constituting this invention is shown connecting a hose H with a faucet F both of ordinary construction This coupling 1 comprises a metal pipe 2 having annular corrugations 3 on its outer face for a portion of its length and the remainder thereof screw threaded as shown at 4, a flange 5 being disposed between the two and forming an abutment for the hose H on one side, and having a rubber sleeve 6 on its other side. This sleeve 6 encircles the annular corrugated portion of the pipe and extends beyond the free ends thereof said end being designed to abut the end of the faucet when applied as shown in Fig. 1, the sleeve encircling the faucet and snugly fitting it.

A metal cap or band 7 encompasses the outer end of sleeve 6 and has an inturned flange 8 of a width corresponding to approximately half the thickness of sleeve 6 (see Fig. 1). This flanged cap band operates to reinforce sleeve 6 beyond pipe 2 and prevents an undue expansion of the sleeve while being forced on the faucet.

A rotary rod 9 extends transversely through sleeve 6 and pipe 2 with its ends projecting beyond the sleeve and one end provided with a knob 10 and the other with a hook 11. A chain 12 is fixedly engaged at one end on the rod between knob 10 and the sleeve. The other end of the chain is designed to be detachably connected with the hook 11 one link of said chain being engaged therewith. The chain is then placed around the faucet beyond the valve B thereof and assists in retaining the coupling in operative position against the weight of a hose.

It will thus be seen that the hose is held engaged with the coupling 1 by the threaded end 4 of pipe 2 which is inserted snugly in the hose. The faucet mouth is then inserted through the capped end of the sleeve and the chain holds it so engaged.

From the foregoing description, taken in connection with the accompanying drawings, the advantages of the construction and of the method of operation will be readily apparent to those skilled in the art to which the invention appertains and while I have described the principle of operation of the invention together with the device which I now consider would be the best embodiment thereof I desire to have it understood that the device shown is merely illustrative and that such changes may be made as are within the scope of the claimed invention.

What I claim is:

A hose coupling comprising a metal pipe threaded exteriorly at one end with a flange at the inner end of said portion, the remainder of said pipe having annular corrugations on its exterior a rubber sleeve encompassing the corrugated portion of said pipe and extending at one end beyond the free end of said portion a band encircling the free end of said sleeve and having an inturned flange terminating approximately midway between the inner and outer peripheries of the sleeve and abutting the end thereof, a rod extending transversely through said pipe and sleeve and having its ends projecting on opposite sides of the sleeve one of said ends having a knob and the other a hook and a chain fixedly engaged at one end to the knob carrying end of the rod and adapted to detachably engage the hook at the other end.

In testimony whereof I affix my signature in the presence of two witnesses.

ARTHUR HENRY WOLFE.

Witnesses:
    MAYSIE WOLFE,
    J. C. CRAPSER.